June 12, 1934.  G. G. LANDIS  1,962,692
WELDING CURRENT GENERATION
Filed Oct. 31, 1932   3 Sheets-Sheet 1

INVENTOR.
George G. Landis.
BY
Fay Oberlin & Fay
ATTORNEYS.

INVENTOR.
George G. Landis
BY
Ray, Oberlin & Ray
ATTORNEYS.

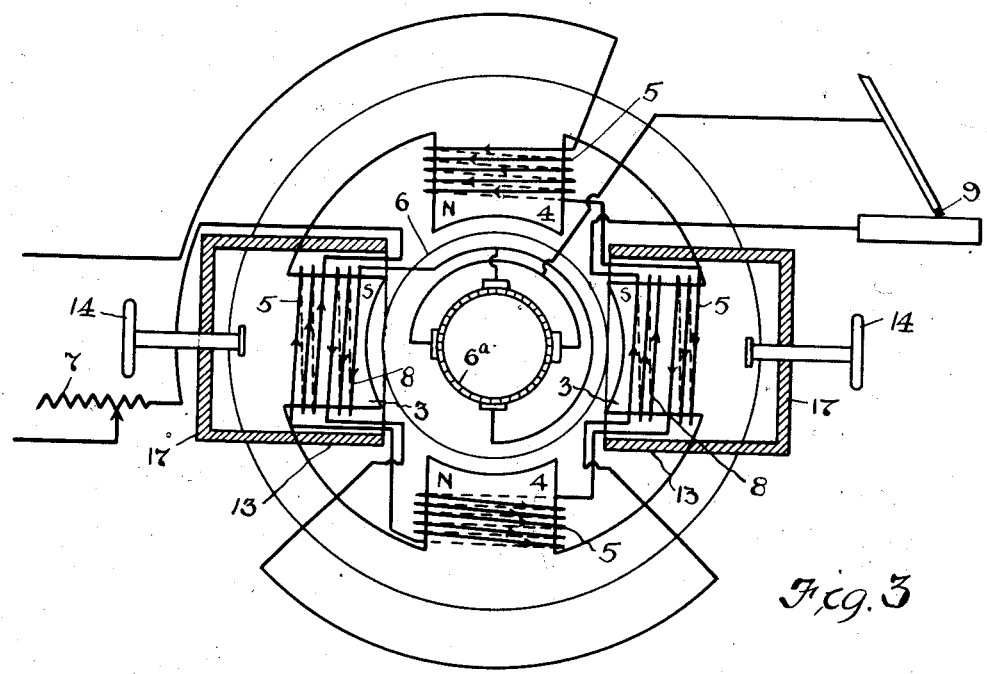
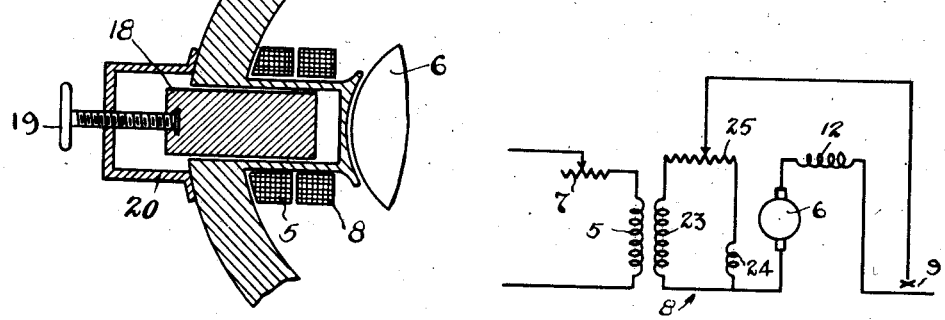
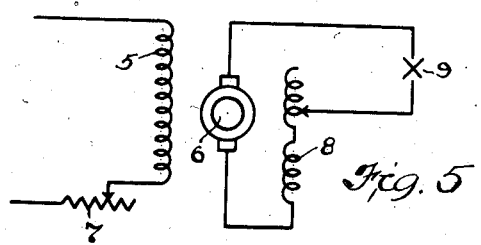

Patented June 12, 1934

1,962,692

UNITED STATES PATENT OFFICE 1,962,692

WELDING CURRENT GENERATION

George G. Landis, Cleveland, Ohio, assignor to The Lincoln Electric Company, Cleveland, Ohio, a corporation of Ohio Application October 31, 1932, Serial No. 640,390

26 Claims. (Cl. 171—223)

This invention relates as indicated to welding current generation and pertains more specifically to the form of construction of a welding current generator having improved operating characteristics and which is capable of ready and accurate control.

It is the principal object of my invention to provide a welding current generator construction in which the transformer action between the series and shunt or separately excited fields is practically eliminated to greatly reduce the recovery time of the machine and to cause the voltage and current to more closely follow the requirements of the arc.

A further object of my invention is to provide a machine which may be readily and accurately adjusted for varying arc requirements. Other objects of my invention will appear as the description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 6:
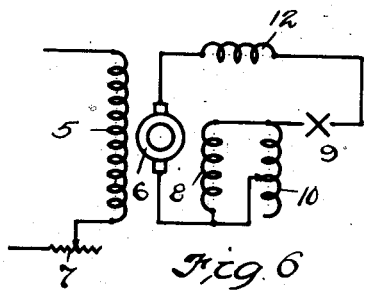
Figure 8:
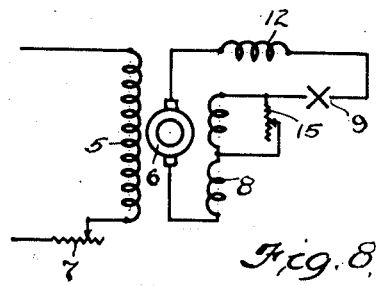
Figure 7:
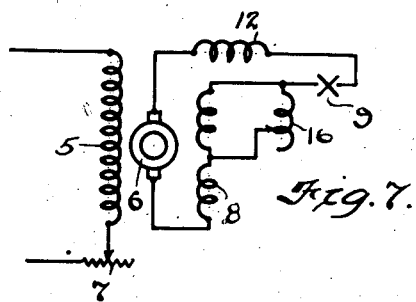

In said annexed drawings:

Figures 1, 2, 3, and 4 are schematic diagrams of various embodiments in welding current generators of the principles of my invention; Figure 5 is a simplified wiring diagram of the circuit illustrated in Fig. 1; Fig. 6 is a simplified wiring diagram of the circuit illustrated in Fig. 2; Figures 7 and 8 are wiring diagrams showing slight modifications of the scheme illustrated most clearly in Fig. 6; Fig. 9 is a simplified wiring diagram showing a further modification for controlling current in the series fields; and Fig. 10 is a fragmentary schematic sectional view of a portion of the machine illustrating a modification of the means for regulating the reluctance of the flux path of the machine.

Figure 1:
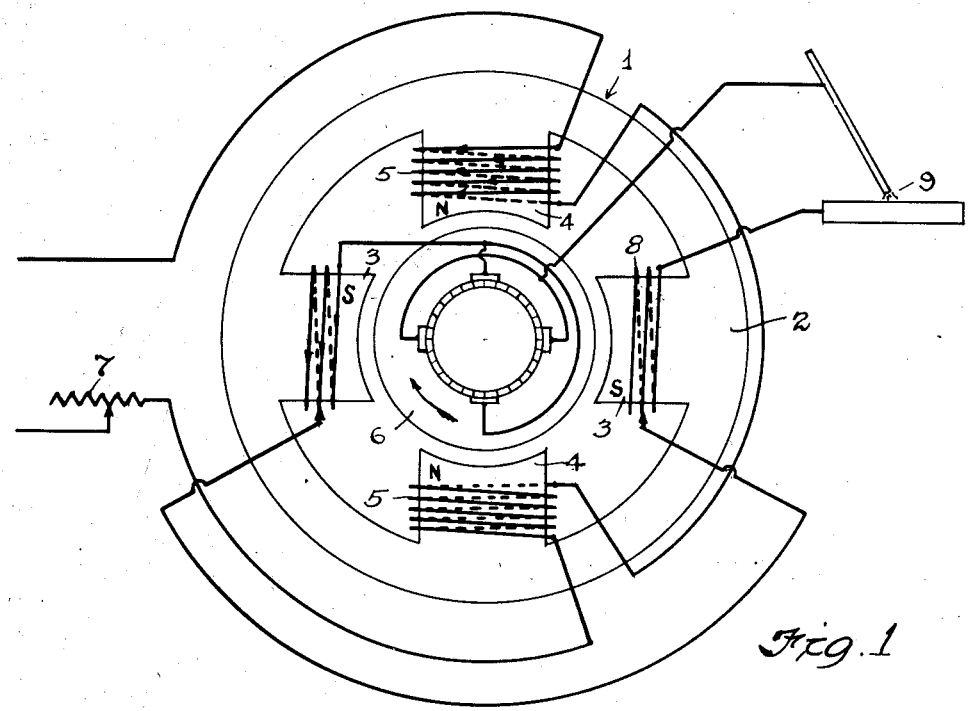

Referring now more specifically to the drawings and more especially to Fig. 1, the generator 1 herein diagrammatically represented consists of a frame 2 having pole-pieces 3 and 4. For purposes of convenience, the machine herein illustrated is of the four-pole type. It should be noted, however, that the principles of my invention are applicable to machines having different numbers of poles, such as 2, 4, 6, 8 etc. The armature of the machine, generally indicated at 6, is provided with the usual armature 6a and a number of brushes corresponding to the number of main poles in the machine.

This construction of the apparatus is substantially identical in all of Figures 1 to 4 and hence, reference characters will be applied to like parts in such figures.

As previously indicated, it is the principal object of my invention to provide a construction in which transformer action between the fields, upon fluctuation of the current in either field, principally the series field, is practically eliminated. This is accomplished in Fig. 1 by arranging the shunt or separately excited field 5 on one set of poles and the series field 8 on another and different set of poles. The lead from the machine to the work being welded, which has in series therewith the windings 8, is connected to the brushes disposed under the pole-pieces carrying the shunt or separately excited windings and the lead from the welding electrode is connected to the brushes under the pole-pieces carrying the series windings. A variable resistance 7 will preferably be included in series with the shunt or separately excited windings whereby the current flow therein may be regulated. The establishment of an arc 9 between the work and a suitable electrode will cause current to flow in the series field 8.

The simplified wiring diagram for the circuit illustrated in Fig. 1 is found in Fig. 5 with like reference characters designating like parts and showing that the strength of the series field may be adjusted by bringing out taps on the series field and thereby varying the number of active turns in such field.

Figure 2:
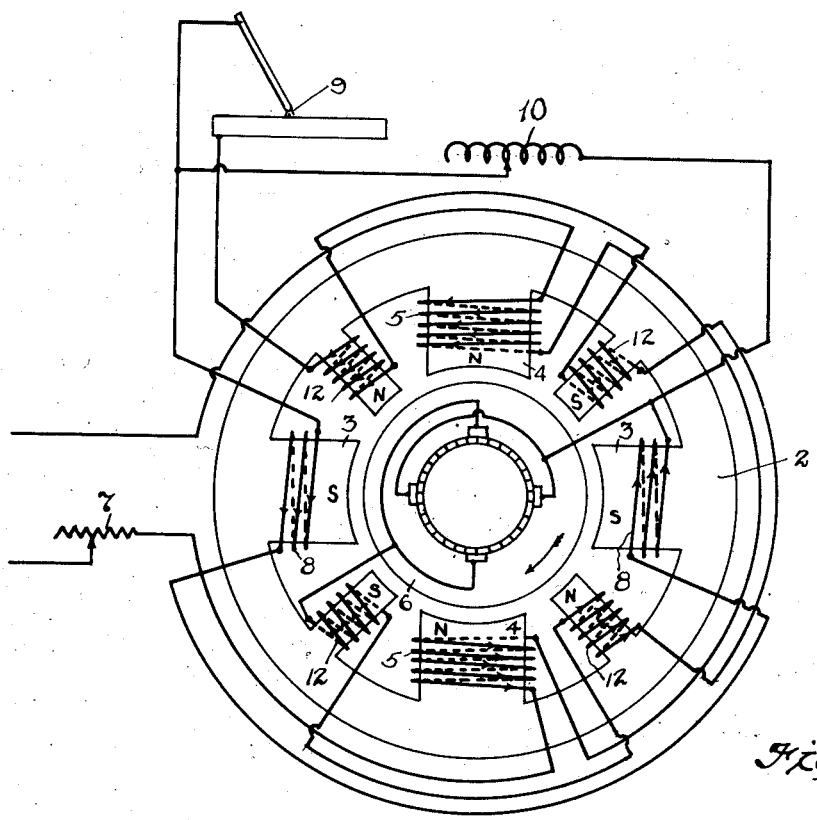

The scheme illustrated in Fig. 2 is identical with that illustrated in Fig. 1 with the exception that in Fig. 2 is illustrated a machine having interpoles carrying series interpole windings 12 and an inductive variable resistance shunt 10 is employed in this scheme for regulating the strength of the series fields as is most clearly illustrated in Fig. 6.

At this point it may be well to note that the inductive variable resistance shunt 10 instead of being connected around all of the series field may be connected as is the similar shunt 16 in Fig. 7, i. e., only around a portion of such field. Furthermore, a variable resistance shunt such as 15 illustrated in Fig. 8 may be employed instead of the inductive variable resistance shunts 10 and 16.

When the strength of the series field is varied or controlled by means of a plain resistance shunt therearound, as illustrated in Fig. 8, such arrangement has certain disadvantages, particularly when the arc is struck. Such disadvantages are overcome, however, by the use of the inductive variable resistance shunt 10.

In an arrangement such as is illustrated in Fig. 8, the impedance of the shunted series field winding, opposes any sudden change in the amount of current flowing therethrough. The major portion of the surge of current which occurs when the arc is struck is, therefore, forced to flow through the resistance shunt 15, and not until after the lapse of an appreciable time interval does the current distribution between the field winding and its shunt reach equilibrium. This time interval, of course, reduces the recovery rate of the machine.

The above enumerated disadvantages inherent in the use of a plain resistance shunt are cured by the use of inductive variable resistance shunts such as 10 and 16. I am aware, of course, that certain so-called plain resistance shunts contain a certain amount of inductive reactance but not sufficient to accomplish the results presently to be explained, which flow from the use of inductive shunts such as 10 and 16. It is also to be understood, of course, that in order to produce the desired results, the inductive reactance of the shunts such as 10 and 16 should be equal to at least a substantial part of, and for certain purposes may be greater than the inductive reactance of the shunted series field winding.

By the term "inductive shunt" as used in the description and claims is, therefore, meant a shunt, the inductive reactance of which is equal to at least a substantial part of the inductive reactance of the shunted series field winding.

The impedance of the shunt, of course, determines the proportional amounts of the welding current which will respectively flow through the shunted series field winding and the shunt at the instant the arc is struck. If the reactance of the shunt is only equal to a small proportional amount of the reactance of the series field winding, then the major portion of the welding current, at the instant the arc is struck, will flow through the shunt. If the reactance of the shunt is equal to the reactance of the series field winding, then the current flow, at the instant the arc is struck, will be evenly distributed between the two branches. If, however, the reactance of the shunt is considerably greater than the reactance of the series field winding, then, at the instant the arc is struck, the major proportion of the welding current will flow through the series field winding. The above statements as to current distribution have been made on the assumption that the resistance in the field and shunt is the same. It is evident that a variation in the amount of resistance in each branch will have the usual effect on current distribution.

After the lapse of a sufficient time interval for the distribution of the welding current between the series field winding and shunt branches of the circuit to reach equilibrium, the respective amounts of current flow through these branches will depend upon the resistance of such branches and this distribution, of course, is controlled by a setting up of the variable resistance in the shunt.

From the foregoing, it will be apparent to those familiar with the art that by a proper proportioning of the reactance in the series field and the shunt therearound, the amount of welding current which will flow through the series field, at the instant the arc is struck, may be controlled to any extent in order to provide the most desirable operating characteristics of the machine.

The employment of the inductive shunt, therefore, results in the setting up of a transient current at the instant the arc is struck, the amount of such transient current depending upon the proportional relationship between the inductive reactance between the shunted series field winding and the shunt. It is to be understood that it is within the contemplation of my invention to utilize such transient currents for any desirable purpose.

The employment of this type of control lends itself particularly to an adjustment of the strength of the series field winding by relatively small increments and by such variation, the output of the machine may be adjusted to closely follow the exact requirements of the arc.

Figure 4:
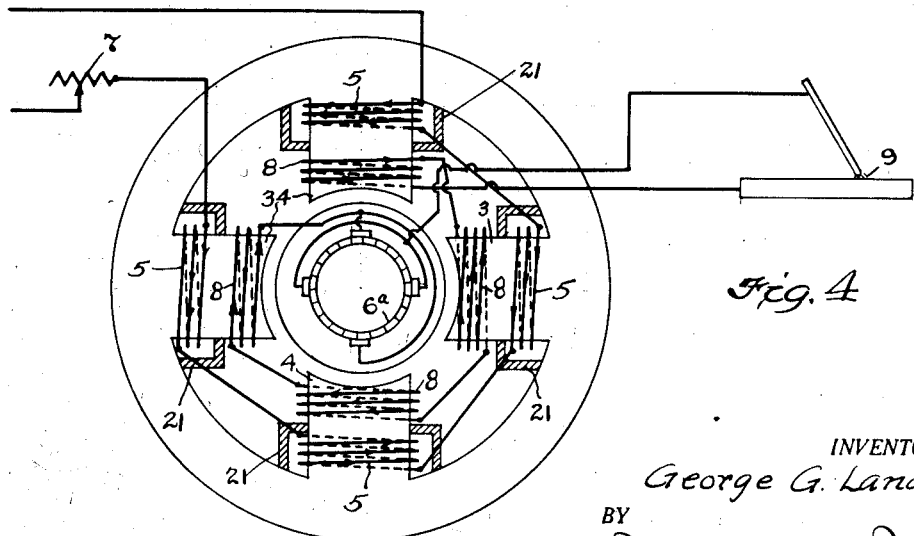

By the employment of magnetic shunts or the like presently to be explained, the series and shunt fields or portions thereof may both be arranged on some of the pole-pieces of the machine as illustrated in Fig. 3 or on all of the pole-pieces of the machine as illustrated in Fig. 4.

When the series and shunt or separately excited windings are arranged on the same pole-pieces of the machine, some means must be provided so as to practically eliminate transformer action between such windings, particularly when fluctuations occur in the welding current.

In Fig. 3 is illustrated a form of adjustable magnetic shunt consisting of a cylindrical element generally indicated at 13 which extends around and in close proximity to the windings on the poles carrying the series and shunt fields and adjustable by means of hand-screws 14 operating in conjunction with brackets 17 supporting the magnetic shunt 13. By axial adjustment of the magnetic shunt 13 with respect to the pole which the same surrounds, the operating characteristics of the machine may be adjusted accurately and without varying the amount of current flowing in the windings. Instead of having the shunt arranged as is illustrated in Fig. 3, it is possible to secure a like or similar result by the provision of a movable core 18 in the pole-piece which may be adjusted relatively to the frame of the machine and the reluctance of the flux path of the fields accordingly varied. A hand-wheel 19 cooperating with a bracket 20, or any other suitable means may be employed for effecting this adjustment.

When all of the main poles of the machine carry both shunt or separately excited and series windings which are differentially related, as is illustrated in Fig. 4, fixed magnetic shunts 21 may be positioned surrounding one set of windings on each pole-piece.

A further arrangement for varying the operating characteristics of the machine is illustrated in Fig. 9, wherein the series field is separated into two parts 23 and 24 respectively, which have an unequal number of turns and which are differentially compound-wound, i. e., accumulatively with respect to each other and differentially with respect to the shunt windings and may be on the same or different pole-pieces of the machine. These two fields are arranged in parallel with a bridging variable resistance 25 to and through which or through at least a portion of which the current flowing in the arc circuit is caused to pass. Movement of the lead from the welding electrode along the resistance 25 will effect the amount of current flowing in the different windings 23 and 24 and due to the difference in the number of turns in these respective windings, the ampere-turn strength of the series field may be varied even when there is no change in the amount of welding current.

As previously indicated, it is the principal object of my invention to provide a direct current arc welding generator in which transformer action between the shunt or separately excited and series windings is practically eliminated. That such results are secured will be apparent from a consideration of the operation of the generator illustrated in Fig. 1. By having reference to such figure it should first be noted that the shunt or separately excited windings and the series windings are arranged on separate sets of pole pieces and wound in such a manner as to give like polarity thereto, i. e., both poles 4 are north poles and when no current is flowing in the welding circuit, the flux from these poles links the armature and pole-pieces 3 completing the circuit through the frame of the machine. This gives a south polarity to the pole-pieces carrying the series windings.

The series windings are arranged on poles 3 so that if there were no other magnetic fields maintained, the poles 3 would both be north poles. When the machine is in operation, therefore, the flux generated by the series fields is in bucking relation to the shunt fields and tends to reverse the south polarity given to the poles 3 by the flux field from the shunt or separately excited windings. The flux from the shunt or separately excited windings is normally, however, in preponderance so that practically no flux from the series field links the shunt or separately excited field. Fluctuations in the welding current, therefore, result in no material transformer action between the two sets of windings and the recovery time of the machine is, therefore, greatly reduced and the voltage and current caused to closely follow the requirements of the arc. This same condition maintains when the more elaborate scheme such as is illustrated in Fig. 2 is employed. The only difference between Figures 1 and 2 is the specific means provided for varying the strength of the series field and further, the provision of interpoles, both of which perform their usual function and in no great measure affect the relationship of the two fields on the basis just explained.

It has been found that the flux from the series field may be prevented from linking the shunt or separately excited winding by associating therewith a magnetic shunt such as is illustrated in Figures 3 and 4.

The various modes of regulating the operating characteristics of the machine, as illustrated in the several drawings 5 to 9, are believed to be sufficiently evident from the previous description of the same so that a further detailed discussion of these figures will not be necessary.

This application is supplemental to my copending application Ser. No. 536,183, filed May 9, 1931.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a dynamo-electric machine having relatively rotatable armature and stator units, said stator including a plurality of pole pieces arranged about said armature; the combination of exciting and series windings arranged on separate pole pieces; said exciting windings when energized giving different polarity to all circumferentially successive main pole pieces; and said series windings when energized tending to reverse the polarity, as produced by said exciting windings, of the pole pieces carrying such series windings.

2. In a dynamo-electric machine having relatively rotatable armature and stator units and said stator including a plurality of pole pieces arranged about said armature, the combination of exciting windings arranged on one set only of said pole pieces and when energized giving like polarity to each of the poles in said set and opposite polarity to the remaining poles, and series windings on said remaining poles when energized tending to reverse the polarity thereof as produced by said first-named windings.

3. In combination with an arc welding circuit, a welding current generator having relatively rotatable armature and stator including a plurality of pole pieces, exciting windings arranged on one set of such poles when energized giving like polarity to each thereof and opposite polarity to each of another set of poles, and windings in series with the welding circuit arranged on said last-named set of poles and when energized tending to reverse the polarity thereof as produced by said first-named windings.

4. In combination with an arc welding circuit, a welding current generator having relatively rotatable armature and stator including a plurality of pole pieces, exciting windings on one set of said poles when energized giving like polarity to each of the poles in said set and opposite polarity to each of another set of poles, windings in series with the welding circuit arranged on said last-named set of poles and when energized tending to reverse the polarity given thereto by said exciting winding, and means for adjusting the strength of the series winding field.

5. In a dynamo-electric machine having relatively rotatable armature and stator units and said stator including a plurality of pole pieces arranged about said armature, the combination of accumulatively wound exciting windings on certain of said pole pieces, series windings accumulatively wound with respect to each other and differentially with respect to said exciting windings arranged on certain of said pole pieces including at least some of the pole pieces bearing said exciting windings, and magnetic shunts around both windings on those poles which carry both series and exciting windings.

6. In a dynamo-electric machine having relatively rotatable armature and stator units and said stator including a plurality of pole pieces arranged about said armature, the combination of exciting windings on at least some of said pole pieces, series windings arranged on at least some of said pole pieces including at least some of the pole pieces bearing said exciting windings, and magnetic shunts around the exciting windings on those poles which also carry series windings.

7. In a dynamo-electric machine having relatively rotatable armature and stator units and said stator including a plurality of pole pieces arranged about said armature, the combination of exciting windings on each of said pole pieces, series windings also arranged on each of said pole pieces, and magnetic shunts positioned around the exciting windings on the respective pole pieces.

8. In combination with an arc welding circuit, a compound-wound welding current generator having an exciting winding and a plurality of field windings respectively having a different number of turns and arranged in parallel with respect to each other and in series with the welding arc, said series windings connected at one end to a lead of the welding circuit, a resistance unit connected across the other ends of said series windings, and a lead from the welding circuit adapted to be connected with said resistance unit at selected points between the connections of said resistance unit to said series windings.

9. In a dynamo-electric machine, a plurality of field windings respectively having a different number of turns and connected in parallel with one end to one side of the field circuit, a resistance unit connected across the other ends of said windings, and a lead from the other side of said field circuit adapted to be connected with said resistance unit at selected points between the connections of said resistance to said field windings.

10. An electric current generator having a series field winding and an additional winding energized from an external source of substantially constant potential, said windings so arranged relatively to each other that when both windings are energized for substantially full load operation of the generator the major portion of the flux generated by each winding will not thread the other winding, and an inductive shunt around at least a portion of said series winding.

11. An electric current generator having a series field winding and an additional winding energized from an external source of substantially constant potential, said windings so arranged relatively to each other that when both windings are energized for substantially full load operation of the generator the major portion of the flux generated by each winding will not thread the other winding, and a variable inductive resistance shunt around at least a portion of said series winding.

12. An electric current generator having a series field winding and an additional winding energized from an external source of substantially constant potential, said windings so arranged relatively to each other that when both windings are energized for substantially full load operation of the generator, the major portion of the flux generated by each winding will not thread the other winding, an inductive resistance shunt around at least a portion of said series field winding, and means for varying said shunt by relatively small increments.

13. An electric arc welding current generator having a series field winding and a separately excited field winding, said windings so arranged relatively to each other that when both such windings are energized for substantially full load operation of the generator, the major portion of the flux generated by each winding will not thread the other winding, and an inductive shunt around at least a portion of said series winding.

14. An electric arc welding current generator having a series field winding and a separately excited field winding, said windings so arranged relatively to each other that when both such windings are energized for substantially full load operation of the generator, the major portion of the flux generated by each winding will not thread the other winding, an inductive resistance shunt around at least a portion of said series winding, and means for varying the inductive reactance of said shunt.

15. An electric arc welding current generator having a series field winding and a separately excited field winding, said windings so arranged relatively to each other that when both such windings are energized for substantially full load operation of the generator, the major portion of the flux generated by each winding will not thread the other winding, an inductive resistance shunt around at least a portion of said series winding, and means for varying the inductive reactance and resistance of said shunt.

16. An electric arc welding current generator having a series field winding and a separately excited field winding, said windings so arranged relatively to each other that when both such windings are energized for substantially full load operation of the generator, the major portion of the flux generated by each winding will not thread the other winding, an inductive resistance shunt around at least a portion of said series winding, and means for varying the resistance of said shunt.

17. In an arc welding system including spaced electrodes adapted to maintain an arc therebetween and means for supplying arcing current in such system comprising an electric current generator having a series field winding and a separately excited field winding, said windings so arranged relatively to each other that when both such windings are energized for substantially full load operation of the generator, the major portion of the flux generated by each winding will not thread the other winding, and an inductive shunt around at least a portion of said series winding.

18. In an arc welding system including spaced electrodes adapted to maintain an arc therebetween and means for supplying arcing current in such system comprising an electric current generator having a series field winding and a separately excited field winding, said windings so arranged relatively to each other that when both such windings are energized for substantially full load operation of the generator, the major portion of the flux generated by each winding will not thread the other winding, an inductive resistance shunt around at least a portion of said series winding, and means for varying the inductive reactance of said shunt.

19. In combination with an arc welding circuit, a welding current generator having relatively rotatable armature and stator including a plurality of pole pieces, separately excited windings arranged on one set of such poles when energized giving like polarity to each thereof and opposite polarity to each of another set of poles, and windings in series with the welding circuit arranged on said last-named set of poles and when energized, tending to reverse the polarity thereof as produced by said first-named windings, and an inductive shunt around at least a portion of said series windings.

20. In combination with an arc welding circuit, a welding current generator having relatively rotatable armature and stator including a plurality of pole pieces, exciting windings, energized from an external source of substantially constant potential, arranged on one set of such poles when energized giving like polarity to each thereof and opposite polarity to each of another set of poles, and windings in series with the welding circuit arranged on said last-named set of poles and when energized tending to reverse the polarity thereof as produced by said first-named windings, and a variable inductive resistance shunt around at least a portion of said series windings.

21. An electric current generator having a series field winding and an additional winding, said windings so arranged relatively to each other that when both windings are energized for substantially full load operation of the generator the major portion of the flux generated by each winding will not thread the other winding, and an inductive shunt around at least a portion of said series winding.

22. An electric current generator having a series field winding and an additional field winding, said windings so arranged relatively to each other that when both windings are energized, the major portion of the flux generated by the series winding will not thread the other winding and an inductive shunt around at least a portion of said series field winding.

23. An electric current generator having a series field winding and an additional winding, a magnetic shunt arranged relatively to said windings whereby the major portion of the flux generated by the series winding will not thread the other winding, and an inductive shunt around at least a portion of said series field winding.

24. An electric current generator having a series field winding and an additional winding, a magnetic shunt arranged relatively to said windings so that when both windings are energized for substantially full load operation of the generator the major portion of the flux generated by each winding will not thread the other winding, and an inductive shunt around at least a portion of said series winding.

25. An electric arc welding current generator having a series field winding and an additional field winding, means providing a magnetic leakage path between such windings of appreciably lower reluctance than that of an equivalent air path, and an inductive shunt around at least a portion of said series field winding.

26. An electric arc welding current generator having a series field winding and an additional field winding, said windings respectively arranged on separate pole pieces of the machine, and an inductive shunt around at least a portion of said series field winding.

GEORGE G. LANDIS.